United States Patent [19]

Cuzin

[11] Patent Number: 4,673,723

[45] Date of Patent: Jun. 16, 1987

[54] POLYAMIDE OLIGOMER-EPOXY POLYMERS AND METHODS FOR THEIR PREPARATION AND USE

[75] Inventor: Daniel Cuzin, Bernay, France

[73] Assignee: ATOCHEM, France

[21] Appl. No.: 768,415

[22] Filed: Aug. 22, 1985

[30] Foreign Application Priority Data

Aug. 27, 1984 [FR] France ................................ 84 13244

[51] Int. Cl.$^4$ ...................... C08G 59/40; C08G 59/42; C08G 65/00
[52] U.S. Cl. .................................... 528/113; 525/423; 528/114; 528/123; 528/310; 528/341; 528/365
[58] Field of Search ................ 525/423; 528/113, 114, 528/123, 310, 341, 365

[56] References Cited

U.S. PATENT DOCUMENTS 3,616,963  11/1971  Sinnott ............................ 525/423 X
4,005,154  1/1977   Bargain ........................... 525/423 X
4,299,747  11/1981  Birkmeyer ....................... 528/114 X Primary Examiner—Lucille M. Phynes
Attorney, Agent, or Firm—Brooks Haidt Haffner & Delahunty

[57] ABSTRACT

Compositions for the preparation of thermosetting or thermoplastic polymers, which compositions comprise a mixture of at least one polyepoxide and at least one polyamide oligomer, wherein the oligomer is a primary monoamine, an alpha,omega-primary or -secondary diamine, an alpha,omega-diacid or an alpha-primary amine,omega-acid, together with processes for preparing polymers and the uses of such materials for molding and for adhesives.

26 Claims, No Drawings

POLYAMIDE OLIGOMER-EPOXY POLYMERS AND METHODS FOR THEIR PREPARATION AND USE

BACKGROUND OF THE INVENTION

The present invention relates to novel compositions based on epoxides and polyamides, and more particularly, it relates to compositions prepared from epoxide resins and polyamide oligomers, processes for their preparation, and their uses.

It is known that epoxide resins can react with polyamides and vice versa. Thus, polyamides can be cross-linked with small quantities of polyepoxides. Conversely, it is possible to produce thermosetting polymers by treating epoxide resins with small quantities of certain polyamides, but in this case conventional methods of cross-linking epoxide resins are involved.

Cross-linking of epoxide resins by polyamides is described in the literature, particularly Lee and Neville, "Handbook of Epoxy Resins", McGraw-Hill, New York 1967. The so-called "polyamide" compounds usually employed as hardeners in epoxide resin formulations are generally amorphous and of low molecular weight. They are, for example, amidopolyamides produced by the reaction of dimerized fatty acids with an excess of diamine or polyamine.

Since dimerized fatty acids are mixtures of isomers of several diacids, with a poorly defined structure, produced by dimerization of mono- or polyunsaturated fatty monoacids, the resultant polyamides themselves have a poorly defined structure and are amorphous. Because of their high content of amine groups (more than two amine groups per molecule), they cross-link epoxide resins, but the amide groups which they contain do not play a dominant role in the final properties of the product. Finally, because of their amorphous nature and their low softening point, these polyamides react with epoxide resins at low temperature.

High molecular weight semi-crystalline polyamides have been employed as additives in epoxide resin formulations to improve some of their properties but, in this case, these polyamides really act as fillers. Moreover, European Patent Application No. 83 1,003,311-6 (Publication No. 0085324) describes polyamide compositions prepared by anionic polymerization of at least 75% lactams with approximately 25% of an epoxide compound, but the process claimed only applies to certain polyamides, that is, those derived from lactams and, furthermore, as it involves anionic polymerization, it has all the disadvantages thereof.

THE INVENTION

The present invention relates to a whole family of novel thermoplastic or thermosetting polymers obtained from oligomers of polyamides derived from monomers which are not necessarily lactams, and from various compounds having epoxide groups. These polyamide oligomers have a definite structure, wherein the molecular weight and the type and number of the terminal groups on the chains are controlled.

The process for the manufacture of these polymers of polyamides and epoxy resins, which process is also the subject of the present invention, comprises reacting the two principal components, a semi-crystalline polyamide oligomer and a difunctional epoxy compound, with each other.

The semi-crystalline polyamide oligomer is a polyamide as defined in the "Polyamide" chapter of "Encyclopedia of Polymer Science and Technology", Vol. 10, page 483 et seq., John Wiley & Sons Inc. 1969, in contradistinction to the polyamides derived from dimerized fatty acids such as defined in the same work in the chapter "Polyamide from Fatty Acids", Vol. 10, page 597 et seq. The polyamide oligomers used herein have either a single reactive group of the primary amine type at one of its two chain terminals and the other end has no reactive group, or they have a reactive primary or secondary amine group or an acid group on each of the two chain ends. The oligomer is then an alpha,omega-primary diamine, an alpha,omega-secondary diamine, or alpha-primary amine, omega-secondary amine, an alpha,omega-diacid, or an alpha-amine, omega-acid, with a primary amine group at one end of the chain and an acid group at the other end. The epoxide resin is a solid or liquid organic compound incorporating at least two epoxide groups in its molecule.

The reaction between these two components can be carried out in a common solvent for both compounds. In certain preferred embodiments, the reaction is carried out in the molten state, at a temperature at or above the melting point of the higher-melting component.

In this manner polymers are obtained, the physical properties of which will be the result of the semi-crystalline structure with which they are endowed by the polyamide oligomer sequences.

In another embodiment of the invention, a mixture of different monofunctional polyamide oligomers (manufactured from various monomeric polyamide precursors) is used, instead of a monofunctional polyamide oligomer. This is also true for the difunctional oligomers. Mixtures of mono- and difunctional polyamide oligomers can also be utilized.

Preparation of Polyamide Oligomer

Regardless of whether it is mono- or difunctional, the polyamide oligomer can be produced from one or more aminoacids, lactams, salts of diacids with diamines, or mixtures of diacids with diamines. Thus, the oligomer can be a copolyamide oligomer.

In certain preferred embodiments, the hydrocarbon chain of the aminoacids, lactams, diacids and diamines contains from four to 14 carbon atoms.

Thus, compounds generally employed in the manufacture of polyamides can be used, as, for example: caprolactam, dodecalactam, aminocaproic acid, oenantholactam, 7-aminoheptanoic acid, 11-aminoundecanoic acid, N-heptyl-11-aminoundecanoic acid, or 12-aminododecanoic acid; mixtures or salts of diamines such as hexamethylenediamine, nonamethylenediamine, undecamethylenediamine, dodecamethylenediamine, meta-xylylenediamine, bis-p-aminocyclohexylmethane, and the like, with diacids such as terephthalic acid, isophthalic acid, adipic acid, azelaic acid, sebacic acid, dodecanedicarboxylic acid, glutaric acid and the like.

These polyamide-forming compounds are melted in the presence of a chain-limiter compound, the proportion of which relative to the above compounds will adjust the length of the polyamide sequence, and thus the molecular weight of the polyamide oligomer.

One method for preparing oligoamides which are monofunctional amine at one end comprises carrying out the polycondensation of the polyamide monomer(s) in the presence of a selected quantity of monoamine. The physical characteristics, and particularly the volatility, of the monoamine are chosen to be compatible with the oligoamide synthesis procedure. As examples of the monoamines which can be employed as chain-stoppers, n-heptylamine, n-octylamine, n-dodecylamine, tetradecylamine, hexadecylamine, octadecylamine, and cyclohexylamine can be used. Another method for preparing monoamine oligoamides comprises first preparing a monoacid oligoamide in a manner similar to that described earlier for the monoamine oligoamides, but replacing the monoamine by an organic monoacid of the general formula RCOOH, where R represents a straight- or branched-chain alkyl radical containing from one to 24 carbon atoms. This monoacid oligoamide is then reacted with a diamine, the concentration of which is such that two amine groups are present for each acid group in the medium. The diamines which can be employed are, for example, aliphatic diamines containing four to 22 carbon atoms such as, for example, tetramethylenediamine, hexamethylenediamine, and nona- and dodecamethylenediamines.

Cycloaliphatic or aromatic diamines can also be used. As in the case of the monoamines, the choice of diamines can be governed by volatility criteria, since the high vapor pressure of the low molecular weight diamines can be disadvantageous in the synthesis of diamine oligoamides.

To prepare the alpha,omega-diacid oligoamides, the polycondensation of the polyamide monomer(s) is carried out in the presence of a suitable quantity of a dicarboxylic acid. Use may be made of aliphatic diacids containing from four to 20 carbon atoms such as, for example, succinic acid, adipic acid, suberic acid, azelaic acid, sebacic acid, undecanedioic acid, or dodecanedioic acid. Alicyclic diacids such as 1,4-cyclohexanedicarboxylic acid, or aromatic diacids, such as terephthalic acid, can also be utilized.

Several methods of synthesis can be used to prepare the alpha,omega-diamine oligoamides. One is like the process for preparing the alpha,omega-diacid oligoamides. It comprises polycondensation of the polyamide monomer(s) in the presence of the required quantity of a diamine. The diamines which can be employed are the same as those which have been described in conjunction with the synthesis of the primary monoamine oligoamides from a monoacid oligoamide and a diamine.

It is also possible to use diamines containing a primary amine group and a secondary amine group, such as (3-aminopropyl)methylamine and other (3-aminopropyl)alkylamines. In this case, the difference in reactivity between the two amine functions in the diamine results in the formation of a high proportion of alpha,omega-diamine oligoamide in which one of the ends has a primary amine group and the other end a secondary amine group.

Another method of preparing the alpha,omega-diamine oligoamides involves starting with an alpha,omega-diacid oligoamide and reacting it with an excess of diamine, the concentration of the diamine being double that of the diacid oligoamide. The diamines which can be employed are the same as those which were described in connection with the synthesis of monoamine oligoamides from a monoacid oligoamide and diamine. As before, when a diamine containing a primary amine group and a secondary amine group is employed, an alpha,omega-diamine oligoamide having a secondary amine group at each end of the chain will be predominantly obtained.

This last type of alpha,omega-secondary diamine oligoamide can also be prepared by employing, as the polyamide monomer, an N-alkylated omega-aminoacid or an N-substituted lactam, alone or mixed with an omega-aminoacid or an unsubstituted lactam. The chain-limiter can be a diamine, either a primary diamine or a diamine containing a primary amine group and a secondary amine group. Thus, a mixture of 11-aminoundecanoic acid and N-heptyl11-aminoundecanoic acid can be polycondensed in the presence of a diamine such as hexamethylenediamine and, because of the aforementioned differences in reactivity, an alpha,omega-diamine oligoamide can be obtained in which the amine groups at the end of the chain are essentially secondary amine groups.

In order to illustrate the various routes, just described, for the synthesis of functional oligoamides, a number of examples are given below, which describe the preparation of polyamide oligomers bearing acid or amine reactive groups at the end of the chain.

All parts, percentages, proportions, and ratios herein are by weight unless otherwise stated.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Preparation of a Primary Monoamine Polyamide-11 Oligomer

A 45-liter steel autoclave, equipped with an anchor stirrer, an oil-bath heating, a relief valve, an electrically heated bottom valve and piping to permit a nitrogen sweep, is charged with 10.2 kg of 11-aminoundecanoic acid and 1.15 kg of dodecylamine. To purge the autoclave, it is pressurized with 5 bars of nitrogen and then depressurized to atmospheric pressure. The purge is repeated five times in succession. The reaction mixture is heated to 240° C. and maintained at this temperature for six hours. With all the valves closed, the pressure in the autoclave becomes steady at 18 bars. The total duration of the operations from the start of heating is 8 hours, 15 minutes.

At the end of this time, the pressure in the autoclave is gradually reduced by carrying out a controlled depressurization from 18 bars down to atmospheric pressure during four hours. This permits most of the water formed by the polycondensation reaction to be removed, and then the reaction mixture is maintained for three hours under a nitrogen sweep of 0.5 $m^3$/hr, the temperature remaining at 240° C. Stirring is then stopped and the reactor is emptied through its bottom valve. The product is collected in a steel vat filled with cold distilled water and it is then drained and dried in a vacuum oven at 80° C. for 12 hours. The molecular weight of the monoamine polyamide-11 oligomer produced is 1720, as determined by its amine functionality.

EXAMPLE II

Preparation of a Primary Monoamine Polyamide-12 Oligomer

An autoclave like that in Example I is charged with 14.5 kg of dodecalactam and 1.5 L of water. A three-liter auxiliary storage vessel capable of withstanding a pressure of 45 bars is connected to the autoclave lid by a valve and 0.57 kg of dodecylamine is introduced into this storage vessel. The autoclave and the attached storage vessel are purged with nitrogen, as described in Example I.

With the autoclave valves closed, the reaction mixture is heated up to 270° C. during 2 hours, 30 minutes, and this temperature is then maintained for six hours, the pressure becoming steady at 29 bars. At the end of this period, the pressure is gradually reduced down to 20 bars during one hour. The attached storage vessel, which has been preheated to 100° C., is raised to a pressure of 35 bars and the valve connecting it to the autoclave is opened so as to transfer the dodecylamine into the autoclave.

Once the dodecylamine has been introduced, the reaction mixture is maintained at 260°-270° C. for three hours at 20 bars and then a gradual depressurization down to atmospheric pressure is carried out, followed by a nitrogen sweel for one hour at a rate of 0.5 m$^3$/hr. The procedure is completed as in Example I. The molecular weight, determined by estimating the amine groups, of the monoamine polyamide-12 oligomer produced is 5035.

EXAMPLE III

Preparation of an alpha,omeqa-Diacid Polyamide-11 Oligomer

A 100-liter autoclave equipped with an anchor stirrer, a hot oil bath, a relief valve, an electrically heated bottom valve, and piping to permit a nitrogen sweep, is charged with 30 kg of 11-aminoundecanoic acid, 30 L of water and 3.1 kg of adipic acid. The reactor is purged with nitrogen as indicated in Example I. The reaction mixture is brought to 180° C. during one hour and the pressure reaches 8.5 bars. Water is then gradually removed by opening the relief valve, which results in a drop in pressure down to atmospheric pressure over 50 minutes. The temperature of the reaction mixture is then raised to 200° C. for one hour, under a nitrogen sweep of 0.5 m$^3$/hr. The product is collected from the bottom valve of the autoclave into a steel vat filled with cold distilled water. The product is drained and then dried under vacuum for 20 hours at 80° C. The molecular weight, calculated from the acid groups, of the alpha,omega-diacid polyamide-11 oligomer produced is 1460.

By carrying out a similar reaction with 30 kg of aminoundecanoic acid and one kilogram of adipic acid, an oligomer with a molecular weight of 4080 is obtained.

EXAMPLE IV

Preparation of an alpha,omega-Diacid Polyamide-12 Oligomer

An autoclave like that employed in Example I is charged with 16 kg dodecalactam, 1.68 L water and 1.8 kg adipic acid. The autoclave is purged with nitrogen as in Example I, and then the valves are closed and the autoclave is heated to 270° C. The reaction mixture is maintained at this temperature for three hours, the pressure becoming steady at 30 bars. A gradual depressurization is then carried out, reducing the pressure from 30 bars to atmospheric pressure, and enabling most of the water to be removed. The temperature is simultaneously lowered from 270° C. to 240° C.

The reaction mixture is then kept at 240° C. for three hours under a nitrogen sweep of 0.5 m$^3$/hr. The product is collected and treated as in Example I. The molecular weight, calculated from the acid groups, of the alpha,omega-diacid polyamide-12 oligomer so obtained is 1542.

EXAMPLE V

Preparation of an alpha,omega-Primary Diamine Polyamide-11 Oligomer

An autoclave similar to that employed in Example III, equipped with a ten-liter additional storage vessel connected to the autoclave cover by a valve, is charged with 35 kg of 11-aminoundecanoic acid and 18 L of water, and 2.0 kg of hexamethylenediamine is introduced into the additional storage vessel. The reactor and the additional storage vessel are purged as in Example I. The reaction mixture is heated to 190° C. over one hour, the pressure reaching 9.3 bars. Water is gradually removed by means of the relief valve during 1 hour, 15 minutes, the pressure decreasing down to atmospheric.

The hexamethylenediamine held in the additional storage vessel is then introduced into the autoclave. With the valves closed again, the temperature is raised to 200° C., the pressure increasing up to five bars, and these conditions are maintained for four hours. At the end of this period, a gradual depressurization is carried out over two hours, returning the pressure from five bars to atmospheric, while the temperature is increased to 240° C. The reaction mixture is maintained for another two hours at this temperature under a nitrogen sweep of 0.5 m$^3$/hr. The alpha,omega-diamine polyamide-11 is collected and treated as in Example III and has a molecular weight, calculated from the terminal groups, of 1980.

Proceeding in a similar manner with 35 kg of aminoundecanoic acid and 1.03 kg of hexamethylenediamine, an oligomer with a molecular mass of 3700 is obtained.

EXAMPLE VI

Preparation of an alpha,omega-Primary Diamine Polyamide-12 Oligomer

An autoclave like that employed in Example I is charged with 15.4 kg of dodecalactam and 1.68 L of water. The autoclave is equipped with an additional storage vessel, as in Example II, into which 1.6 kg of hexamethylenediamine is introduced. The autoclave and the additional storage vessel are purged with nitrogen as in Example I. The remainder of the process is identical to the operating procedure described in Example II.

The molecular weight of the alpha,omega-diamine polyamide-12 oligomer obtained, calculated from the amine groups, is 1214.

EXAMPLE VII

Preparation of an alpha,omega-Secondary Diamine Polyamide-11 Oligomer

A six-liter steel autoclave, provided with an anchor stirrer, electric heating, a relief valve, an electrically heated bottom valve and piping for a nitrogen sweep, is charged with 752 g N-heptyl-11-aminoundecanoic acid, 1450 g 11-aminoundecanoic acid and 116 g hexamethylenediamine. The apparatus is purged with nitrogen as in Example I.

The mixture is heated to 250° C. and this temperature is maintained for approximately two hours, the pressure becoming steady at approximately 9 to 10 bars. At the same temperature, depressurization is carried out down to atmospheric, and the reaction is allowed to proceed under a nitrogen sweep for four hours. The stirring is then stopped and the contents of the reactor are drained through the bottom valve into liquid nitrogen. The product is ground and then dried under vacuum at 60°–70° C. for eight hours.

The melting point of the oligoamide produced, determined by differential thermal analysis, is 165° C. $^{13}C$ NMR (nuclear magnetic resonance) analysis shows only traces of a primary amine group. It is accordingly concluded that the terminal groups are substantially secondary amine groups.

The molecular weight of the oligoamide, determined from the amine groups, is 1980.

EXAMPLE VIII

Preparation of an alpha,omega-Primary Diamine Polyamide-6 Oligomer and a Monoamine Polyamide-6 Oligomer The process is carried out in the same equipment as that described in Example II with 17 kg of caprolactam and 1.3 L of water introduced into the autoclave, and 2 kg of hexamethylenediamine in the additional storage vessel. The whole apparatus is purged with nitrogen as in Example I.

With all the valves closed, the apparatus is heated to 260° C. and the pressure becomes steady at 20 bars. These conditions are maintained for four hours with stirring at 30 rpm. A controlled depressurization is then carried out down to 2.5 bars and the temperature is lowered to 250° C.

The attached storage vessel, preheated to 100° C., is raised to a pressure of three bars, and the valve which connects it to the autoclave is opened to transfer the hexamethylenediamine into the autoclave.

The reaction mixture is then held for four hours at 250° C. and 5 bars, and then the pressure is gradually reduced down to atmospheric. This depressurization stage lasts two hours. The reaction is then terminated by a nitrogen sweep for 0.5 hr at 250° C. The finishing steps take place as in Example I.

The molecular weight of the alpha,omega-primary diamine polyamide-6 oligomer produced, determined from the amine groups, is 1074.

To prepare a monoamine polyamide-6 oligomer, the operating procedure is strictly identical, the only difference being that 1.25 kg of dodecylamine is introduced into the additional storage vessel.

The molecular weight of the monoamine polyamide-6 oligomer obtained, determined from the amine group, is 2690.

Epoxide Compound

This compound, which will react with the oligoamide, contains at least two epoxide groups in its molecule. It can be solid or liquid.

At present there is a very large number, both on the market and in the scientific and technical literature, of organic compounds corresponding to this definition and whose structures are very diverse. The most widely used compounds are those derived from the reaction of bisphenol-A with epichlorohydrin and, in particular, the compounds resulting from the addition of two molecules of epichlorohydrin to one molecule of bisphenol-A, that is, the diglycidyl ethers of bisphenol-A (DGEBA). For example, there are the products marketed by Shell under the name Epikote 828, or by Dow Chemical under the name DER 332. However, it will be understood that the polymers of the present invention include a large number of other epoxide resins, such as those resulting from the attachment of an epoxide group to both ends of a paraffinic hydrocarbon chain, (for example, butanediol-derived diepoxides), or a polyether chain such as the polypropylene glycol alpha,omega-diepoxide, marketed by Dow Chemical as DER 732 or DER 736. Individual diepoxide compounds, such as vinylcyclohexene dioxide; 3,4-epoxycyclohexylmethyl-3,4-epoxycyclohexanemonocarboxylate; 3-(3,4-epoxycyclohexyl)-8.9-epoxy-2,4-dioxaspiro-[5.5]-undecane; bis(2,3-epoxycyclopentyl) ether; bis(3,4-epoxy-6-methylcyclohexyl) adipate, resorcinol diglycidyl ether, and the like can also be utilized.

When the final product is to have a high cross-link density, it is desirable to employ epoxide compounds containing more than two epoxide groups per molecule, such as epoxidized soya oils, polyglycidyl ethers of phenolic resins of the novolak type, p-aminophenol triglycidyl ether, or 1,1,2,2-tetra-(p-hydroxyphenyl)ethane tetraglycidyl ether. Different polyepoxide compounds can also be used.

In addition to these two fundamental components, other materials, such as heat, light and oxidation stabilizers, dyes and pigments, plasticizers, various reinforcing or non-reinforcing fillers and mold release agents, and the like, can be included in the reaction mixture.

Relative Proportions of the Polyamide Oligomer and the Epoxide Compound

The number-average molecular weight of the polyamide oligomers employed in the invention can vary within a wide range from 400 to 10,000, and in certain preferred embodiments molecular weights of from 1000 to 7000 are used.

The proportion of the polyamide oligomer and of the epoxide compound is such that the number of epoxide groups is equal to the number of the reactive end groups in the polyamide oligomer. In the case of compositions based on a diacid oligoamide, the quantity of epoxide resin is such that the composition contains one epoxide group for each acid group. However, for reasons of reaction rate and of finished product quality, it may be desirable to depart from this theoretical composition and to employ compositions containing from 0.9 to 1.6 epoxide groups per acid group in the oligoamide.

In the case of monoamine oligoamides, since the amine group is difunctional with respect to the epoxide group, the composition of the reaction mixture will be two epoxide groups in the mixture per amine group. If the diepoxide compound employed is represented as:

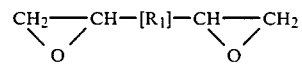

where $R_1$ denotes a difunctional organic radical, which can contain heteroatoms, and if $R_2$—PA—$NH_2$ represents the monoamine oligoamide produced by polycondensing a polyamide precursor monomer with an amine having the formula $R_2$—$NH_2$, where $R_2$ denotes a monovalent hydrocarbon radical, then, by using one molecule of diepoxide compound per molecule of monoamine oligoamide, which actually corresponds to two epoxide groups per amine group, a polymer having the structure:

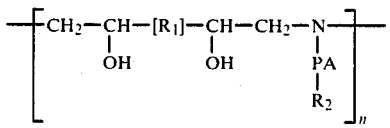

is obtained.

This is a non-cross-linked copolymer, comprising a polyol tertiary polyamine principal chain derived from the original structure of the epoxide compound and short polyamide side chains. When an epoxide compound containing more than two epoxide groups is employed, a cross-linked polymer can be obtained.

As in the case of compositions based on a diacid oligoamide, it may be desirable, for reasons of reaction kinetics, slightly to modify the relationship between the epoxide group and the amine group. The ratio can be varied from 1.6 to 2.4.

In the case of a diamine oligoamide with a primary amine end group, the ratio between the epoxide group and the amine group can be varied over a wider range than in the case of a monoamine oligoamide. In effect, when a diepoxide compound having the structure:

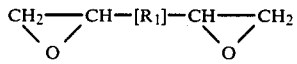

is polycondensed with a diamine oligoamide having the structure: $NH_2-PA-R'_2-PA-NH_2$, produced by polycondensing a polyamide precursor monomer with a $NH_2-R'_2-NH_2$ diamine, (where $R'_2$ denotes a difunctional hydrocarbon radical), the proportion of oligoamide to diepoxide being such that there is one epoxide group per amine group in the mixture, then an essentially straight-chain polymer having the structure:

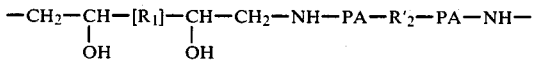

is produced at the beginning of the reaction.

At the end of the reaction, for kinetic reasons (reducing the concentration of primary amine and epoxide groups and increasing the concentration of secondary amine), a number of bridges may form and result in a partly cross-linked polymer.

By selecting a stoichiometry such that there are two epoxide groups per amine group in the initial mixture and by allowing the reaction to continue to completion, a cross-linked polymer is obtained in which the majority of the amine groups are tertiary amines, and its nominal structure is:

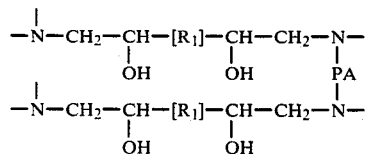

In the case of a primary diamine oligoamide it is accordingly possible, depending on the nature of the polymer which it is intended to produce, and particularly on the cross-link density which is sought in the case of thermosetting polymers, to select a composition in which the ratio of epoxide groups to amine groups is from 0.9 to 2.5. In some cases, in fact, it is preferred to use compositions such that there are more than two epoxide groups per amine group, to retain a number of free epoxide groups in the resin to provide particular properties when the polymers are put to use, for instance, adhesion to various substrates.

In the case of a diamine oligoamide with secondary amine end groups of the general formula:

where $[R_2'']$ represents a monovalent alkyl radical having one to 24 carbon atoms, the polymer obtained is substantially straight-chain and has the structure:

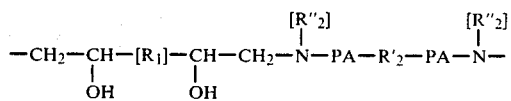

since each secondary amine group is monovalent with respect to the epoxide groups. Secondary reactions, such as the reaction between the OH groups formed and the epoxide groups which have not yet reacted or the polymerization reaction of the epoxide groups with each other, catalyzed by the tertiary amines formed, can in some embodiments provide cross-linking.

The theoretical stoichiometry which makes it possible to produce a straight-chain polymer with a high molecular weight is thus that of one epoxide group per secondary amine group or, which amounts to the same thing, one molecule of alpha,omega-secondary diamine oligoamide per molecule of diepoxide compound. Nevertheless, for reasons of reaction kinetics, or to take into account secondary reactions which may entail a faster consumption of one of the reactive groups relative to the other, it is preferred in certain embodiments to use a ratio of epoxide to secondary amine of from 0.8 to 1.15.

The reaction producing polymers according to this invention can be carried out in accordance with a wide variety of operating methods. In point of fact, one of the advantageous characteristics of the two-reactant system—functional oligoamide and epoxide resin—of the invention is that it reacts rapidly at temperatures above the melting point of the oligoamide chosen, without releasing volatile compounds and without the absolute necessity of adding a catalyst.

The preparation of these copolymers can be carried out in a conventional autoclave of the same type as those generally employed for the synthesis of homopolyamides or copolyamides of high molecular weight. In such a case, the oligoamide chosen is charged into the reactor which is then heated to a temperature about ten degrees Celsius above the melting point of the oligoamide. The desired quantity of epoxide resin is then added and kept stirred for the time required to produce a homogeneous mixture. If the homogeneous mixture is drained out through a multiple orifice die, the polymer can be obtained in the form of rods, and then as granules after passing through a granulator.

The granules so produced can then be used to manufacture molded articles using conventional injection-molding machinery.

Another operating method for the preparation of the copolymer of this invention comprises carrying out the homogenization and the prepolymerization of the mixture of the two components of the system in a compounding machine. This produces a prepolymer, in the form of powder or granules, which can be employed in subsequent uses. These uses, during which the polymerization will continue, can take place in accordance with various methods. As before, an injection molding method can be employed, provided that the reactivity of the system is compatible with the residence time in the injection machine. It is also possible to use the "Pultrusion" technique, which produces an extrusion with a specified cross-section, by resin-coating in a so-called "crosshead" die, a fiberglass core which passes continuously through the die, the cross-section of which is that of the extrusion to be produced. If desired, the extrusion, after being coated with the resin, is passed through an oven in which the polymerization of the resin is carried to completion.

The manufacture of the polymer and its molding into largesized articles can be carried out in a single operation by employing the reaction injection molding (RIM) technique described, for example, in Modern Plastics International, April 81.

In this case, the two components of the system—the oligoamide and the epoxide resin—are stored in liquid form in two separate storage tanks maintained at a temperature sufficient to keep the two reactants liquid. The polymerization and the molding of the finished articles are carried out simultaneously by pumping from the two storage tanks the required quantity of each of the two reactants, mixing them in a special device which very rapidly produces a highly intimate mixture of the two components, and injecting the mixture so produced into the mold. The polymerization of the resin takes place during the mixing of the two components in the mixing head and continues during transfer into the mold, to be completed in the latter. In this type of procedure, given that the cycle time for the manufacture of the finished article is directly related to the rate of polycondensation of the mixture of the two components, the most reactive combinations of oligoamide and epoxide compound are used. If need be, the reaction rate can be still further increased by adding a catalyst such as a tertiary amine.

Finished articles can, of course, be produced in a similar manner by employing conventional techniques for the conversion of thermoplastics, such as extrusion, injection molding, rotary molding, heat-forming, and the like.

The physical or mechanical properties of the polymers produced are determined on molded or machined specimens with the following standardized methods: tension-elongation by ASTM Standard D 638; flexural modulus by ASTM Standard D 790; Heat Deflection Temperature under load (HDT) by ASTM Standard D 648; and Shore hardness by ISO Standard D 868.

The inherent viscosity, expressed in $cm^3/g$, is measured at 25° C. on solutions of polymer in m-cresol at a strength of 0.5% by weight.

EXAMPLE IX

The alpha,omega-diacid polyamide-11 oligomer, with a molecular weight (M.W.) of 1460, obtained in Example III, is mixed in the amount of 370 g in a beaker with 120 g of bisphenol A diglycidyl ether (DGEBA) having an epoxide number equal to 187 (Epikote 828 resin from Shell) and a molecular weight of 374. The epoxide/acid ratio is thus 1.25.

The mixture is heated to 180° C. with stirring until a homogeneous, pale yellow liquid is obtained. This liquid is poured into a circular steel mold which is then kept for 15 minutes at 180° C. between the heating platens of a hydraulic press producing a pressure of 11 metric tons.

After cooling and demolding, a homogeneous, pale yellow disc is obtained, from which specimens are cut with a punch cutter for the purpose of carrying out mechanical testing. The values of the mechanical properties of the material are given in Table I.

EXAMPLE X

The procedure of Example IX is repeated with the relative proportions of the two reactants modified: 132 g of Epikote 828 is added to 345 g of alpha,omega-diacid polyamide-11 oligomer, which corresponds to an epoxide/acid ratio of 1.50. The subsequent procedure is identical to that in Example IX and the mechanical properties of the material produced are given in Table I.

EXAMPLE XI

The alpha,omega-diacid polyamide-11 oligomer with an M.W. of 4080, prepared according to the process illustrated in Example III in the amount of 190 g is placed in a beaker and heated to 190° C. with stirring. When the polyamide oligomer is molten, 26 g of Epikote 828, preheated to 90° C., is quickly added with stirring. The homogeneous mixture obtained is poured quickly into a steel mold comprising an annular device of rectangular shape and two removable plates with plane faces defining a parallelepipedal volume $140 \times 140 \times 6.4$ mm. The duration of the operations of mixing the two components of the resin and filling the mold is of the order of one to two minutes. The resin-filled mold is kept for 10 minutes at a temperature of between 190 and 200° C. between the heating platens of a hydraulic press producing a pressure of 10 metric tons.

After cooling, a yellowish, slightly translucent, homogeneous plaque is removed from the mold and specimens for mechanical tests are cut out by machining.

A similar procedure is followed with a mold of slightly different size ($165 \times 165 \times 4$ mm) for the mechanical tests which require specimens of lesser thickness.

The mechanical properties of the material obtained appear in Table I.

EXAMPLE XII

An alpha,omega-primary diamine polyamide-11 oligomer having a molecular weight (M.W.) of 1980, prepared according to the procedure described in Example V, in the amount of 170 g is placed in a beaker and heated to 190° C. with stirring. Once the polyamide oligomer has melted, 56 g of polypropylene glycol alpha,omega-diepoxide resin with a molecular weight of 660 and an epoxide number of 330 (DER 732 from Dow Chemical), preheated to 90° C., is added very quickly with vigorous stirring. The epoxide/amine ratio is one.

The homogeneous and viscous mixture obtained is quickly poured into a steel mold similar to that described in Example IX. The total duration of the operations of mixing the two components of the resin and filling the mold does not exceed 30 seconds. The polymerization of the mixture in the mold takes place under the same conditions as in Example IX, and a thinner mold is also used as in Example IX.

The plaques obtained are homogeneous, whitish and opaque. The mechanical properties of the material are given in Table I.

EXAMPLE XIII

The procedure followed is as in Example XII, using an alpha,omega-primary diamine polyamide-11 oligomer with a molecular weight of 3700. The quantity of polyamide oligomer used is 190 g and that of polypropylene glycol alpha,omega-diepoxide (DER 732), 34 g. The epoxide/amine ratio is again one.

The mechanical properties of the material obtained under the same conditions as in Example XII are given in Table I.

EXAMPLE XIV

A previously prepared 1384 M.W. alpha,omega-diacid polyamide-11 in the amount of 17.3 kg is introduced into a 90-liter autoclave, equipped with an anchor stirrer. The material is melted at 200° C. under nitrogen pressure, and then the temperature is lowered to 180° C. and the nitrogen pressure is lowered to atmospheric. From a storage tank attached to the lid of the reactor through a valve, 8.275 kg of polypropylene glycol alpha,omega-diepoxide of 660 M.W. (DER 732 from Dow Chemical) is then introduced into the reactor, which corresponds to an epoxide/acid ratio of one. The mixture is kept at 180° C. for 30 minutes with stirring and under a nitrogen sweep.

At the end of this time, the polymer is withdrawn through a multiple orifice bottom valve, in the form of flexible rods which, after cooling in a water bath and granulation, give 23.2 kg of granules with an inherent viscosity in meta-cresol, $\eta i$, of 0.51.

These granules are employed to produce specimens for mechanical tests with the use of an injection molding machine. The specimens are parallelepipedal bars $6.4 \times 12.7 \times 127$ mm in size and dumbbell-shaped samples 2 mm in thickness and 160 mm in length, the plasticizing temperature being 180° C. and that of the mold 20° C.

The mechanical properties obtained are reported in Table I.

EXAMPLE XV

A homogeneous mixture is produced containing 68.8% of alpha,omega-diacid polyamide-11 (molecular weight: 1463) and 31.2% of polypropylene glycol alpha,omega-diepoxide (DER 732 from Dow Chemical), which corresponds to an epoxide/acid ratio of one, by compounding with a Werner-Pfleiderer ZSK 30 twin-screw extruder with 12 barrel units. The polyamide oligomer is introduced into the machine through the feed hopper in the form of a coarse powder, and the epoxide resin is introduced in liquid state into the molten polyamide, at the 4th barrel unit of the machine by means of an injection pump at a pressure of 15 to 20 bars.

The material temperatures at various points of the screw are between 194° and 220° C. The throughput is 10 kg/hr. The product leaving the die is collected in water. After drying, the product can be easily ground into powder. Its melt viscosity at 200° C. is 70 poises. When the product is maintained for 1 hour 40 minutes at 200° C., its melt viscosity rises to 10,000 poises.

EXAMPLE XVI

A homogeneous mixture is produced, containing 87% of 4412 molecular weight alpha,omega-diacid polyamide-11 and 13% of polypropylene glycol alpha,omega-diepoxide, DER 732 from Dow Chemical, which corresponds to an epoxide/acid ratio of 1.0, by compounding with the Werner-Pfleiderer ZSK 30 machine, under the conditions of Example XV, except for slightly higher material temperatures (200° to 224° C.). The melt viscosity at 200° C. of the product collected is 400 poises; it rises to 800 poises at the end of 1 hour 40 minutes at this temperature.

The oligomer with a viscosity of 400 poises, ground into powder form, is employed to produce mechanical test specimens by means of an injection press in the same manner as in Example XII. The mechanical properties are set out in Table I.

EXAMPLE XVII

A homogeneous mixture containing 64.2% by weight of 1542 M.W. alpha,omega-diacid polyamide-12 oligomer from Example IV and 35.8% by weight of polypropylene glycol alpha,omega-diepoxide (DER 732 from Dow Chemical) with an epoxide number of 330, which corresponds to an epoxide/acid ratio of 1.3, is prepared. The mixture is made by compounding with a Werner-Pfleiderer ZSK 30 twin-screw extruder with 12 barrel units, under conditions like those described in Example XIII. The material temperatures at various points of the screws are between 187° C. and 220° C. The throughput is 10 kg/hr. The polymer obtained, ground into powder form, is employed to produce mechanical test specimens with an injection press in the same way as in Example XIV. The mechanical properties of the specimens are set forth in Table I.

EXAMPLE XVIII

A 1720 M.W. polyamide-11 monoamine, prepared according to the process described in Example I, in the amount of 1230 g and 270 g of DGEBA (Epikote 828 from Shell), with an epoxide number of 187, which corresponds to an epoxide/amine ratio of two, are introduced into a six-liter steel autoclave equipped with an anchor stirrer, electric heating, an electrically heated bottom valve and plumbing to permit a nitrogen sweep. The weight proportions are 82% of monoamine polyamide-11 oligomer and 18% of epoxide resin. The reactor is closed, the mixture is heated for 1 hour 30 minutes at 210° C., while being stirred and swept with nitrogen. At the end of this reaction period, a homogeneous, whitish, rigid polymer with an inherent viscosity in meta-cresol, $\eta i$, of 0.87 cm$^3$/g and an intrinsic viscosity, $\eta$, of 1.06 cm$^3$/g, is recovered through the bottom reactor valve. Mechanical properties are shown in Table I.

EXAMPLE XIX

The procedure of Example XVIII is followed, but using 1395 g of monoamine polyamide-12 oligomer of 5035 molecular weight, obtained according to the procedure described in Example XII, and 105 g of DGEBA (Epikote 828 from Shell) with an epoxide number of 187. The epoxide/amine ratio is two and the weight proportions of each component are 92% polyamide-12 oligomer and 8% epoxide resin. After 30 minutes' reaction at 200° C., there is withdrawn through the reactor bottom valve a whitish, rigid and opaque polymer with a homogeneous appearance, an inherent viscosity in meta-cresol of 1.45 cm$^3$/g and an intrinsic viscosity, $\eta$, of 1.55 cm$^3$/g. Mechanical properties are shown in Table I.

EXAMPLE XX

By compounding with the aid of a Werner-Pfleiderer ZSK 30 twin-screw extruded a homogeneous mixture is produced containing 86% by weight of a 2191 M.W. primary monoamine polyamide-11 oligomer, obtained according to the method described in Example I, and 14% by weight of DGEBA epoxide resin (DER 332 from Dow Chemical, with an epoxide number of 176), the epoxide/amine ratio in the mixture being two.

The operating conditions for the compounding are the same as those described in Example XV. The throughput is 10 kg/hr and the residence time in the machine is 1 min 30 sec. A homogeneous viscous liquid is obtained at the die, solidifying at ambient temperature and lending itself readily to being ground into powder form. The inherent viscosity of this prepolymer in m-cresol is 0.73. The prepolymer is used to feed an injection press and to mold mechanical test specimens as indicated in Example XIV. The mechanical properties determined on the molded specimens are given in Table I.

EXAMPLE XXI

The procedure of Example XX is followed but with a monoamine polyamide-11 oligomer having an M.W. of 4265. The weight proportion of polyamide oligomer is 92.4% and that of DER 332 7.6%. The product obtained at the die exit, much more viscous than in the preceding Example, can be granulated under the conditions which are usually employed for thermoplastic polymers. Its inherent viscosity in m-cresol is 1.06.

The granules obtained are used as in the preceding Example, to mold mechanical test specimens under the following conditions:

| | |
|---|---|
| Plasticising temperature | 220° C. |
| Injection temperature | 250° C. |
| Mold temperature | 20° C. |

The mechanical properties determined on the molded specimens are given in Table I.

EXAMPLE XXII alpha,omega-Secondary diamine polyamide-11 oligomer with a molecular weight of 1980, prepared according to the procedure described in Example VII in the amount of 180 g is weighed into a beaker and heated to 190° C. with stirring. Once the polyamide oligomer has melted, 350 g of DER 332, preheated to 150° C., is added quickly with vigorous stirring. The epoxide/amine ratio is one. The homogeneous mixture thus obtained is used to produce molded plaques under the same conditions as in Example XI. The plaques obtained are homogeneous and translucent and have excellent mechanical strength. The material has a melting point of 151° C. and a crystallinity of 16.6%, as determined by DSC.

EXAMPLE XXIII

The monoamine polyamide-6 oligomer with a molecular weight of 2690, prepared in Example VIII, is introduced in the amount of 48.6 g into the mixing trough of a Haake kneader maintained at 230° C.

At a kneader blade rotational speed of 60 rpm, the torque in g-m is zero. Then, 6.4 g of DGEBA epoxide resin (DER 332 from Dow Chemical) of 352 M.W., preheated to 160° C., are added, this corresponding to an epoxide/amine ratio of two. After 15 minutes' kneading, the torque recorded by the apparatus is 555 g-m, which corresponds to a polyamide molecular weight of 10,000. It is double the torque recorded when kneading a commercial polyamide-6 at the same temperature.

DT analysis shows the following physical properties:

| | |
|---|---|
| Glass transition temperature | 50° C. |
| Melting point | 212° C. |
| Crystallinity | 33% |

EXAMPLES XXIV to XXVIII

A Martin Sweets reaction injection molding (RIM) machine of the Flexamatic RHP1 type is used to produce molded plaques by reacting an alpha,omega-primary diamine polyamide-11 oligomer or an alpha,omega-primary diamine polyamide-6 oligomer, respectively, with DER 332 epoxide resin.

The machine comprises the following components: a double-entry mixing head which, in open position, ensures intimate mixing of the two reactants and their transfer towards the mold described below, and, in closed position, ensures recirculation, without mixing, of each of the reactants towards lines A and B described below; a square mold, 305×305×3 mm in size, supplied with the mixture originating from the mixing head; and two lines A and B connected to the mixing head, each incorporating a storage volume for one of the reactants, and a hydraulically controlled metering unit. This metering unit permits either the recirculation of that line's reactant in a closed circuit between the storage volume and the mixing head in the closed position, without mixing with the reactant in the other line, or injection of the reactant into the mixing head in the open position, the delivery pressure simultaneously permitting the intimate mixing with the reactant coming from the other line and the flow of the mixture into the mold. A detailed description of the principle of RIM machines is found in the work "Introduction to Reaction Injection Molding", Technomic Publ. Co. Inc. 1979, pages 77 to 126.

All the components of the machine can be controlled up to a temperature of 235° C. and the operating temperature of each component can be set independently of that of the other components.

The ratio between the two reactants and the homogeneity of the mixture are determined by controlling, on the one hand, the settings of the metering units in each line and, on the other hand, the diameter of the valve connecting each line to the mixing head.

The conditions in the various tests carried out on the RIM machine are shown in Table II. Three tests are carried out without fiberglass reinforcement, and two other tests are carried out by placing in the mold, before injection of the mixture of reactants, a fiberglass mat from the Vetrotex Company and having the name Unifilo U 816 (375 g/m$^2$), which represents 12.3% by weight of fiberglass filler and 87.7% by weight of resin. In all cases, the mold is completely filled and the plaques produced have an excellent appearance. Their properties are given in Table III.

EXAMPLE XXIX

Using a Brabender extruder equipped with a 42.4 mm diameter 5 D double screw, a homogeneous mixture is produced by compounding 80 parts by weight of 4080 molecular weight alpha,omega-diacid polyamide-11 oligomer and 20 parts by weight of 978 molecular weight DGEBA epoxy resin (Epikote 1001 from Shell), which corresponds to an epoxide/acid ratio of one.

The material temperature is 200° C. and the residence time 30 seconds. The viscosity of the homogeneous mixture produced at the die exit differs little from that of the starting polyamide oligomer, which shows that the degree to which the reaction has progressed is very low. The reactant mixture is then cooled in water, ground into the form of a fine powder with a mean particle size of 100μ, and then heated moderately under vacuum.

The fine reactant powder thus produced is deposited by sprinkling onto a 16 satin weave fiberglass cloth (from Stevens Genin, ref. 374, 240 g/m²). A stack of 15 layers of glass cloth sprinkled with resin is produced in an identical manner.

The whole is then compressed between the platens of a press at 200° C. under 14 bars for 15 minutes, and then cooled to 80° C. under pressure. A 2.42 mm thick composite material is thus obtained, where the impregnation of the fiber reinforcement is completely produced by virtue of the fluidity of the reactant system. The mechanical flexure tests give the following results:

| Porosity volume ratio in % | <3 |
|---|---|
| Fiber volume ratio in % | 55.6 |
| Flexure 23° C. (ASTM D 790): | |
| Maximum stress | 506 ± 9 Ma |
| Elasticity modulus | 23,600 ± 300 Ma |

EXAMPLE XXX

A carbon fiber cloth with an 8 satin weave (Stevens Genin, ref. 40830, 364 g/m²) is impregnated using the same reactant mixture as in Example XXIX. A stack of eight layers of carbon cloth, preimpregnated with powder by sprinkling, is produced. The whole is then compressed between the platens of a press at 200° C. under 5 bars for 15 minutes, and thereafter cooled to 80° C. under pressure.

A 2.15 mm thick completely impregnated composite material is obtained. The mechanical flexure tests give the following results:

| Porosity volume ratio in % | <3 |
|---|---|
| Fiber volume ratio in % | 52.3 |
| Flexure 23° C. (ASTM D 790): | |
| Maximum stress | 577 ± 31 MPa |
| Elasticity modulus | 40,300 ± 6,000 MPa |

EXAMPLE XXXI

A homogeneous mixture of 61 parts by weight of a 1535 M.W. alpha,omega-primary diamine polyamide-11 oligomer and 39 parts by weight of Epikote 1001 resin, which corresponds to an epoxide/amine ratio of one, is produced as in Example XXIX by compounding in a Brabender extruder. The mixture is ground into fine powder form and dried under vacuum.

The fine powder produced is deposited by sprinkling onto a fiberglass cloth with a 16 satin weave (from Stevens Genin, ref. 374, 240 g/m²), and a stack of ten layers of glass cloth impregnated with powder in this way is produced. The whole is then compressed between the platens of a press at 200° C., under 12 bars for 12 minutes, and then cooled to 80° C. under pressure. A 2.2 mm thick composite plaque, suitably impregnated by virtue of the high fluidity of the reactant system, is produced with the following properties:

| Porosity volume ratio in % | <3 |
|---|---|
| Fiber volume ratio in % | 42.6 |
| Flexure 23° C. (ASTM D 790): | |
| Maximum stress | 338 MPa |
| Elasticity modulus | 13,700 MPa |
| HDT 1.8 MPa (ASTM D 648) | 176° C. |

The operating methods which have just been described, as illustrated by the preceding Examples, permit the production of molded articles in which the constituent material is the thermoplastic or the thermosetting resin of the present invention. However, this same resin, owing to its properties of adhesion to a large number of substrates, with which it is endowed by the epoxide compounds which it contains, finds many good uses in the field of coatings and in the field of adhesives.

Respecting coatings, it is possible to apply to the resins according to the invention the same techniques as those employed for polyamide powders but, in contrast to the latter, it is possible to produce coatings with a great adhesion to steel without the need to pretreat the metal substrate with an undercoat to promote good bonding of the polyamide. Various techniques are utilized for producing these coatings. It is possible to employ a powder produced by grinding the homogeneous prepolymer obtained by mixing in molten state in a suitable compounding machine the difunctional polyamide oligomer and the epoxide compound as taught above. It is also possible to use a powder consisting of a mechanical mixture, produced cold, of the difunctional polyamide oligomer and the epoxide compound. The coating of the substrate using these powders is carried out in accordance with the known coating methods, for example, by electrostatic spraying followed by a cure of several minutes at a high temperature of 200° to 250° C., or by dipping the substrate, preheated to an elevated temperature, in a fluidized bed in which the powder is kept in suspension.

In the field of adhesives, the thermoplastic or thermosetting polymers according to this invention are particularly well suited for gluing metal structures, provided that the substrates to be assembled by gluing can withstand the high temperature required to ensure the polymerization of the system. This is particularly the case for assemblies employing metals such as steel or aluminum. Depending on the nature of the oligoamides and the epoxide compounds employed, the temperature at which the gluing is carried out may be from 100° to 250° C., but in most cases the operation will be carried out between 150° and 220° C. As in the case of the coatings, gluing can be carried out with the polymers of the invention in accordance with various methods of application. It is possible to use the homogeneous prepolymer prepared by mixing in the molten form, in a suitable compounding machine, the functional oligoamide and the epoxide compound. It is also possible to use a powder comprising a mechanical mixture, produced cold, of the epoxide compound and the functional oligoamide. The gluing can be carried out by heating between the platens of a heating press the two metal surfaces which are to be assembled, separated by the required quantity of the prepolymerized or non-prepolymerized mixture of oligoamide and diepoxide compound. This mixture can be used in the form of a powder or a film.

Another use involves depositing the molten mixture on one of the surfaces to be joined, contacting the other surface, and subjecting the assembly to the combined effect of pressure and temperature with the aid of a suitable device.

The following Examples illustrate the applications of the polymers of the invention in the field of coatings and the field of adhesives.

EXAMPLE XXXII

A 2040 M.W. alpha,omega-diamine polyamide-11 oligomer and DGEBA resin (Epikote 1004 from Shell) with an epoxide number of 1045 and a molecular weight of 2090 are separately reduced by passage through a grinder to a fine powder having a particle size distribution (measured with a Coulter counter) of between 10 and 80 nicrons and a mean diameter of 30 to 35 microns.

An alpha,omega-diamine polyamide-11 powder in the amount of 39.5 parts by weight and 60.5 parts by weight of Epikote 1004 resin powder are carefully mixed with a 2 kg Henschel blade mixer to produce a homogeneous mixture of the two compounds having an epoxide/amine ratio of 1.5.

The mixture is applied to a sand-blasted 180×180×1 mm steel plate. The application is made with the electrostatic coating method and a positive potential difference of 30 kV.

The powder-coated plate is then placed for four minutes in an oven kept at 220° C. This cure treatment converts the powder into a polymer film with an average thickness of 50μ.

According to an empirical test which permits the adhesion of the polyamide powder coatings to be classified against a rating scale ranging from 0 (zero adhesion) to 4 (excellent adhesion), the coating produced is given the rating 4.

After the substrate is bent over a 5 mm radius of curvature, no cracks appear on the coating.

EXAMPLES XXXIII to XXXVI

The procedure of Example XXXII is followed, but using various mixtures of alpha,omega-diamine polyamide-11 oligomer and DGEBA resins (Epikote 1004 or 1001, the latter having a molecular weight of 978), the compositions of the mixtures being given in Table IV.

In all cases, the coatings produced under the operating conditions described in Example XXXII have satisfactory appearance and quality and do not show cracking when they are bent.

EXAMPLE XXXVII

The prepolymer prepared in accordance with the process described in Example XIV, by reacting in the molten state in an autoclave an alpha,omega-diacid polyamide oligomer of 1384 M.W. with a polypropylene glycol alpha,omega-diepoxide resin (DER 732 from Dow Chemical), having an epoxide number of 330, is reduced by cryogenic grinding into a powder with a particle size distribution of between 10 and 100μ, and a mean particle diameter of 56μ.

This powder is applied to a steel plate in accordance with the method described in Example XXXII and, after a heat treatment for four minutes in an oven at 220° C., a film is obtained with an average thickness of 60μ, an adhesion of 3 on the rating scale defined in Example XXXII and good bending strength.

EXAMPLE XXXVIII

The prepolymer prepared according to the operating method described in Example XIV by reacting in the molten state form a 1384 M.W. alpha,omega-diacid polyamide oligomer with the DER 732 resin having an epoxide number of 330 and ground into fine powder form according to the operating method described in Example XXXVII is employed to produce glue joints on aluminum and steel specimens.

The glued specimens, conforming to ISO Standard 4587, are 100×25×1.6 mm in size, with a joint covering area of 25×12.5 mm. They are degreased beforehand in a 1,1,1-trichloroethane bath with ultrasonic agitation, and are then dried in air.

The bonds are produced by depositing the required quantity of powder on the covering surface of the assembly, which is then heated for two minutes at 200° C. under a pressure of one bar. The specimens are then subjected to a heat treatment for 2 hours 30 minutes at 230° C. in an oven.

The shear strength of the assemblies is measured using a J. J. Lloyd T20K tensometer equipped with a thermostatic enclosure permitting the measurement to be carried out at various temperatures. Each of the results presented in Table V below is the average of five measurements carried out on five different specimens.

TABLE I

| EX-AMPLE | Oligoamide Type | M.W. | Epoxide resin Type | M.W. | Epoxide/acid or epoxide/amine ratio | Tensile test (ASTM D 638) Break strength MPa | Tensile test (ASTM D 638) Elongation at break % | HDT (ASTM D 648) °C. | Flexural modulus MPa (ASTM D 790) at 20° C. | Hardness Shore D (ISO D 868) |
|---|---|---|---|---|---|---|---|---|---|---|
| IX | $PA_{11}diCOOH$ | 1460 | DGEBA (1) | 374 | 1.25 | 36 | 230 | — | 1210 | 74 |
| X | $PA_{11}diCOOH$ | 1460 | DGEBA (1) | 374 | 1.50 | 30 | 230 | — | 1115 | 73 |
| XI | $PA_{11}diCOOH$ | 4080 | DGEBA (1) | 374 | 1.50 | 47 | 170 | — | 1100 | 71 |
| XII | $PA_{11}diNH_2$ | 1980 | PPG di-epoxide (3) | 660 | 1 | 41 | 200 | 51 | 215 | 55 |
| XIII | $PA_{11}diNH_2$ | 3700 | PPG di-epoxide (3) | 660 | 1 | 31 | 33 | 61 | 510 | 66 |
| XIV | $PA_{11}diCOOH$ | 1384 | PPG di-epoxide (3) | 660 | 1 | 13 | 144 | 71 | 209 | 49 |
| XVI | $PA_{11}diCOOH$ | 4412 | PPG di-epoxide (3) | 660 | 1 | 27 | 69 | 133 | 469 | 61 |
| XVII | $PA_{12}diCOOH$ | 1542 | PPG di-epoxide (3) | 660 | 1.3 | 24.5 | 51 | 68 | 193 | 47 |
| XVIII | $PA_{11}monoNH_2$ | 1720 | DGEBA (1) | 374 | 2 | — | — | — | 1183 | — |
| XIX | $PA_{12}monoNH_2$ | 5035 | DGEBA (1) | 374 | 2 | 46.3 | 70 | 127 | 1248 | 68 |

TABLE I-continued

| EX-AMPLE | Oligoamide Type | M.W. | Epoxide resin Type | M.W. | Epoxide/ acid or epoxide/ amine ratio | Tensile test (ASTM D 638) Break strength MPa | Tensile test (ASTM D 638) Elongation at break % | HDT (ASTM D 648) °C. | Flexural modulus MPa (ASTM D 790) at 20° C. | Hardness Shore D (ISO D 868) |
|---|---|---|---|---|---|---|---|---|---|---|
| XX | $PA_{11}monoNH_2$ | 2191 | DGEBA (2) | 352 | 2 | 26.4 | 4 | — | 1212 | 70 |
| XXI | $PA_{11}monoNH_2$ | 4265 | DGEBA (2) | 352 | 2 | 43.1 | 22 | — | 1246 | 73 |

(1) Bisphenol A diglycidyl ether - Epikote 828 (Shell) - Epoxide number = 187
(2) Bisphenol A diglycidyl ether - DER 332 (Dow Chemical) - Epoxide number = 176
(3) PPG alpha, omega-diepoxide - DER 732 (Dow Chemical) - Epoxide number = 330

TABLE II

| EXAMPLE | Line A PA alpha, omega-diNH$_2$ Type | M.W. | Flow rate g/s | T, °C. | Line B DER 332 M.W. | Flow rate g/s | T, °C. | Mixing head T, °C. | Mold T, °C. | Fill time | Hold time |
|---|---|---|---|---|---|---|---|---|---|---|---|
| XXIV | $PA_6diNH_2$ | 1074 | 95 | 190 | 350 | 31 | 140 | 200 | 190 | 4 s | 10 min |
| XXV | $PA_{11}diNH_2$ | 1239 | 85 | 180 | 350 | 24 | 140 | 200 | 180 | 4 s | 10 min |
| XXVI | $PA_{11}diNH_2$ | 1239 | 85 | 180 | 350 | 24 | 140 | 200 | 180 | 4 s | 10 min |
| XXVII | $PA_{11}diNH_2$ | 1978 | 93 | 190 | 350 | 16.8 | 140 | 200 | 180 | 3.3 s | 10 min |
| XXVIII | $PA_{11}diNH_2$ | 1978 | 93 | 190 | 350 | 16.8 | 140 | 200 | 180 | 4 s | 10 min |

TABLE III

| EXAMPLE | Composition, weight % PA diNH$_2$ | Composition, weight % DER 332 | Composition, weight % Fiberglass | Epoxide amine | T, °C. | Crystallinity % | Melting point, °C. | Mechanical properties Flexural modulus, MPA (1) 25° C. | Mechanical properties Flexural modulus, MPA (1) 100° C. | Tensile test, (ASTM D 648) Break strength, MPa | Tensile test, (ASTM D 648) Elongation at break, % |
|---|---|---|---|---|---|---|---|---|---|---|---|
| XXIV | 75.4 | 24.6 | — | 1 | — | — | — | — | — | — | — |
| XXV | 78.0 | 22.0 | — | 1 | 48 | 19 | 151 | 1740 | 115 | 30 | 245 |
| XXVI | 68.4 | 19.3 | 12.3 | 1 | 52 | — | — | 2630 | 549 | 47 | 4.6 |
| XXVII | 84.7 | 15.3 | — | 1 | 51 | — | — | 1738 | 132 | 30 | 211 |
| XXVIII | 74.2 | 13.5 | 12.3 | 1 | 57 | — | — | 3020 | 630 | 47 | 5.3 |

(1) Determined by DMA - DuPont apparatus DMA 981

TABLE IV

| | Polyamide 11 alpha, omega-diamine M. W. | Quantity | DGEBA Type | Epoxide number | Quantity | Epoxide/ amine ratio | Coating thickness, microns | Adhesion |
|---|---|---|---|---|---|---|---|---|
| Test 33 | 4006 | 56.5 parts | Epikote 1004 | 1045 | 43.5 parts | 1.5 | 230μ | 4 |
| Test 34 | 4066 | 81 parts | Epikote 1001 | 489 | 19 parts | 1.0 | 120μ | 3–3.5 |
| Test 35 | 4066 | 73.5 parts | Epikote 1001 | 489 | 26.5 parts | 1.5 | 110μ | 3.5–4 |
| Test 36 | 6321 | 85.5 parts | Epikote 1001 | 489 | 14.5 parts | 1.1 | 110μ | 4 |

TABLE V

| Traction Temperature | Shear strength, (daN/cm$^2$) Substrate Aluminum | Shear strength, (daN/cm$^2$) Substrate Degreased metal sheet |
|---|---|---|
| −40° C. | ≧240 | 203 |
| 20° C. | 237 | 178 |
| 80° C. | 133 | 144 |
| 140° C. | 59 | 73 |

EXAMPLE XXXIX

Forty parts by weight of a 4066 M.W. alpha,omega-primary diamine polyamide-11 oligomer is ground into a finely powdered state. The powder obtained is mixed intimately with ten parts by weight of powdered DGEBA epoxy resin of 978 M.W. (Epikote 1001 from Shell, epoxide number 489), which corresponds to an epoxide/amine ratio of one. The mixture of powders thus prepared is employed to produce glued bonds on aluminum specimens of the same type as those described in Example XXXVIII.

The glue bonds are produced at 200° C. under a pressure of one bar for 15 minutes. There is no subsequent heat treatment. The shear strengths, measured at various temperatures, are as follows:

| Temperature | 20° C. | 80° C. | 140° C. |
|---|---|---|---|
| Shear strength (daN/cm$^2$) | 346 | 194 | 61 |

What is claimed is:

1. A composition for the preparation of thermosetting or thermoplastic polymers, which composition comprises a mixture of at least one polyepoxide and at least one polyamide oligomer which polyepoxide and oligomer can react to form a polymer, wherein the oligomer is a primary monoamine, an alpha,omega-primary or -secondary diamine, an alpha,omega-diacid or an alpha-primary amine,omega-acid.

2. A composition according to claim 1 wherein the oligomer has a mean molecular weight of from 400 to 10,000.

3. A composition according to claim 1 wherein the oligomer has a mean molecular weight of from 1,000 to 7,000.

4. A composition according to claim 1 wherein the oligomer is obtained by the polycondensation of a monomer which is an aminoacid, a lactam, a diacid salt of a diamine, a mixture of diacids with diamines or a mixture of two or more of said monomers.

5. A composition according to claim 4 wherein the monomer has a hydrocarbon chain containing from four to 22 carbon atoms.

6. A composition according to claim 4 wherein the monomer has a hydrocarbon chain containing from four to 14 carbon atoms.

7. A composition according to claim 1 wherein the oligomer is obtained by polycondensation of caprolactam, dodecalactam, 11-aminoundecanoic acid, hexamethylenediamine adipate, or a mixture of two or more of these monomers.

8. A composition according to claim 1 wherein the polyamide oligomer is a monoamine oligoamide obtained by polycondensation of at least one polyamide monomer in the presence of a primary monoamine.

9. A composition according to claim 8 wherein the monoamine is dodecylamine.

10. A composition according to claim 1 wherein the oligomer is an alpha,omega-diamine obtained by polycondensation of at least one monomer in the presence of a primary or secondary diamine having from four to 22 carbon atoms.

11. A composition according to claim 10 wherein the primary diamine is hexamethylene diamine.

12. A composition according to claim 10 wherein the quantities of the polyepoxide ant the alpha,omega-diamine oligomer are such that the ratio of epoxy functions to amine functions is from 0.9 to 2.5 when the diamine is a primary amine and from 0.8 to 1.15 when the diamine is a secondary amine.

13. A composition according to claim 1 wherein the polyepoxide is at least one diglycidylether of bisphenol A or an alpha,omega-diepoxypolypropylene glycol.

14. A composition according to claim 13 wherein the bisphenol A diglycidylether has a molecular weight of from about 300 to 2100 and an epoxy index of from about 150 to 1100.

15. A composition according to claim 1 wherein the oligomer is an alpha,omega-diacid obtained by polycondensaton of at least one monomer in the presence of a carboxylic diacid having from four to 22 carbon atoms.

16. A composition according to claim 15 wherein the diacid is aliphatic.

17. A composition according to claim 15 wherein the diacid is adipic acid.

18. A composition according to claim 15 wherein the quantities of polyepoxide and alpha,omega-diacid are such that the ratio of epoxy functions to acid functions is from 0.9 to 1.6.

19. A composition according to claim 1 wherein the oligomer is an alpha-amine-omega-acid obtained by polycondensation of at least one monomer in the absence of a chain limiter.

20. A thermoplastic polymer prepared by melting the composition according to claim 1 and thereby reacting the polyepoxide and the oligomer.

21. A thermosetting polymer prepared by melting the composition according to claim 1 and thereby reacting the polyepoxide and the oligomer.

22. A method for the preparation of molded artifacts which comprises heating the composition according to claim 1 and placing the composition in a mold.

23. A method according to claim 22 wherein the molding is carried out with an injection molder.

24. A method according to claim 22 wherein the molding is carried out by reaction injection molding.

25. A method according to claim 22 wherein the molding is carried out by compression molding.

26. A method according to claim 22 wherein the molding is carried out by Pultrusion to obtain sections having longitudinal reinforcing fibers in the polymer formed.

* * * * *